Aug. 25, 1931.    E. P. ENGSTROM    1,820,882
TRACTOR BAND
Filed Sept. 7, 1927
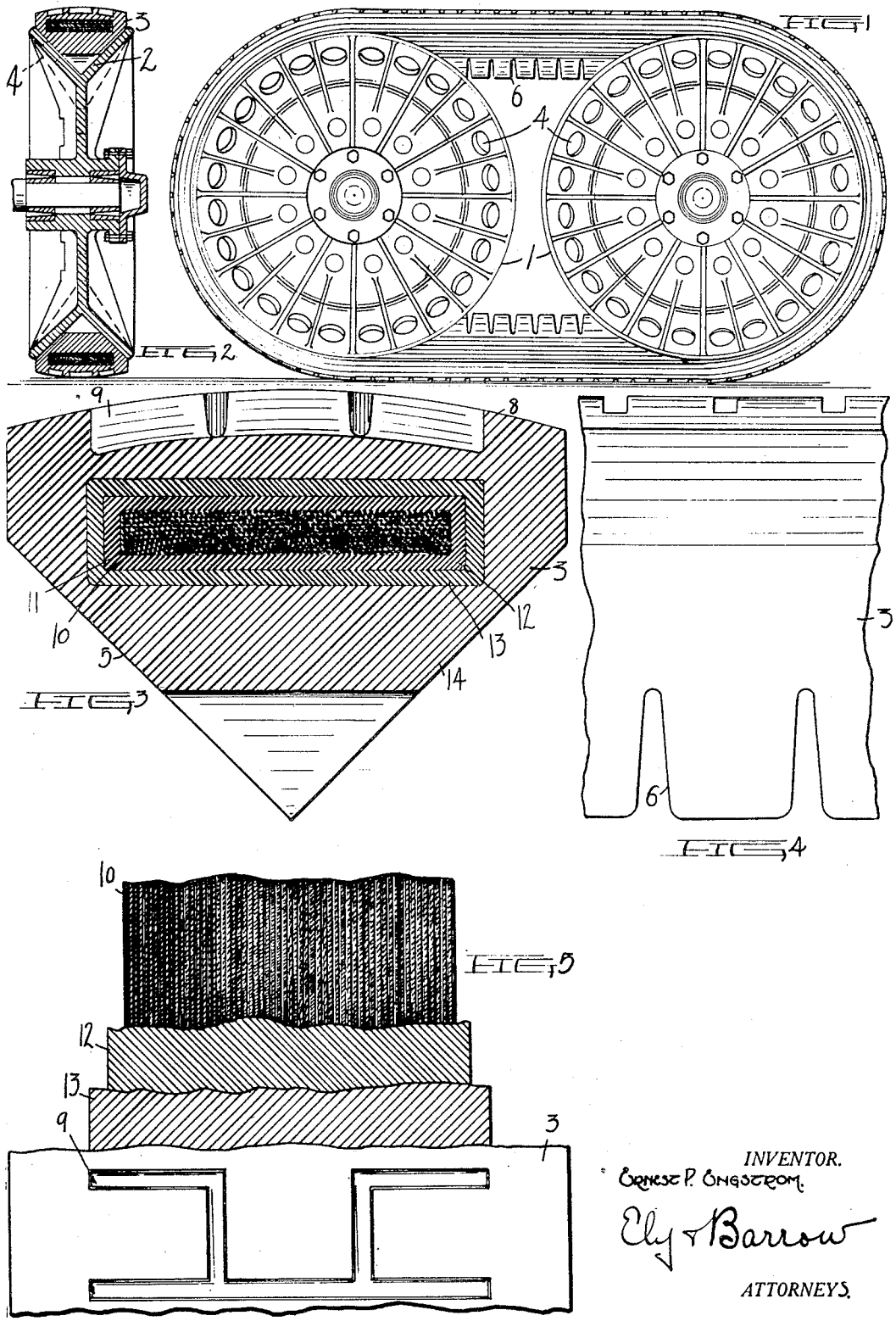
INVENTOR.
Ernest P. Engstrom.
Ely & Barrow
ATTORNEYS.

Patented Aug. 25, 1931

1,820,882

UNITED STATES PATENT OFFICE

ERNEST P. ENGSTROM, OF AKRON, OHIO, ASSIGNOR TO THE McNEIL BOILER COMPANY, OF AKRON, OHIO, A CORPORATION OF OHIO

TRACTOR BAND

Application filed September 7, 1927. Serial No. 217,990.

This invention relates to improvements in endless tractor bands such as used in attachments for trucks or heavy vehicles where the wheels are provided with an endless belt or tractor band which supports and drives the vehicle.

In tractor devices of this type, it has been proposed to utilize as the driving element of the machine an endless rubber tire or band, but difficulty has been experienced in constructing the band so that it would withstand the extremely hard usage to which it has been put.

The object of the present invention is to construct a tire which is well adapted for use in tractor work and will have a longer life than any previously devised tire for this purpose.

A further object of the invention is to devise a tractor tire or band which will stand up under heavy operating conditions without danger of blowing out of the internal portions thereof as the band becomes internally heated.

The nature of the invention, its utility and advantages will appear from the following description and the drawings accompanying the application, it being understood, however, that the showing is not intended as limiting the scope of the invention beyond a fair interpretation of the claims in the light of the prior art.

In the drawings,

Figure 1 is a view in side elevation of a tractor unit, the driving mechanism and means of attachment to the vehicle being omitted as forming no part of the present invention;

Figure 2 is a cross-section through one of the wheels of the unit;

Figure 3 is an enlarged cross-section through a tire;

Figure 4 is a side elevation of a short section thereof; and

Figure 5 is a plan view of a section thereof stepped down to show the construction of the several layers.

The tractor device comprises two wheels or pulleys 1 which are spaced apart a suitable distance and which are provided on their outer peripheries with substantially V-shaped channels 2 in which the rubber tread or tire element 3 is received. The walls of the channels are apertured at 4 to permit the passage of any dirt or foreign substances which otherwise would be packed between the tire and the wheel. One of the pulleys is driven to propel the vehicle and the two pulleys are mounted so that they are yieldingly held apart to normally hold the tire in taut condition, but to permit the lower run of the tire to bend or give in going over obstructions. As this type of device is well known prior to my invention, the details thereof are not shown.

The tire comprises a body of rubber having the requisite strength and abrasive resisting properties, being preferably made from a high-grade of tire tread stock. About its inner periphery, it is provided with sloping sides 5 which fit in the channels of the wheels 1, the apex of the tire being notched, as shown at 6, so that that portion of the tire may be compressed in passing about the peripheries of the wheels. The outer portion or body of the tire extends beyond the peripheries of the wheels and is provided with a slightly crowned wearing surface 8 having non-skid or traction formations 9 thereon.

In order to reenforce the tractor band, there is located transversely of the band and at about its central plane or at the point where the tapering sides 5 begin, a flexible but inextensible reenforcing band or element, which is vulcanized with the main body of the band and forms an integral part thereof.

This reenforcement comprises a cord 10, preferably of cotton twine, spirally wound about the band to form a plurality of layers of cords, the convolutions in each layer being spaced apart and each layer being separated by a thin sheet of rubber 11, whereby when the tire is vulcanized, each convolution of the cord 10 will be completely embedded in rubber. Rubber 11 is compounded to form a rather stiff or semi-hard jacket about the cords when vulcanized to effectively cushion the cords and prevent their cutting through the body of the tire. In order to further cushion and bind the reenforcement in the tire, a layer 12 of rubber compound, slightly less stiff than rubber 11, is covered about the cord reenforcement. Another layer 13 of still less stiff rubber is covered about layer 12 and is in turn surrounded by the outer body 14 of flexible tire tread stock. The tire is vulcanized to form a composite structure of embedded cords and inseparable surrounding layers of graduated stiffness.

Skilled rubber artisans, of course, will understand that the degrees of stiffness of the several portions of the tire are obtained by different compounds of rubber with vulcanizing and other ingredients. For example, sulphur, which is a vulcanizing agent, employed in the compounding of the rubber batches for the several portions of the tire will be used in increasing proportions for stocks of increasing stiffness. The standard stock for tire treads are well-known containing sufficient sulphur and other compounding ingredients to produce a tough, flexible rubber. To obtain a rubber of somewhat less flexibility, more sulphur and perhaps other different ingredients will be included in the compound. Rubbers varying in all degrees from hard rubber to highly flexible rubber are secured in this way by skilled artisans. Of course in a flexible tire band, the innermost rubber portion must be somewhat flexible though comparatively stiff to avoid too much action or flow of rubber about the core which would tend to separate the rubber from the core, the outer portion of rubber must be quite flexible since it is extended or compressed most in passing about the wheels and provides most of the necessary cushioning action, and the intermediate porton must be of a flexibility between these two so that it will flow under pressure or under stresses of flexure with somewhat less freedom than the outer portion and somewhat greater freedom than the inner portion while at the same time not differing so much from each as to induce separation,—that is, a graduated change from stiffer rubber at the center to more flexible at the outside of the tire prevents separation of the several parts of the tire due to differences between the activity thereof when subjected to stresses applied thereon in use.

The cords provide a flexible yet inextensible reenforcement and the stiff embedding rubber and outer layers of graduated stiffness prevent blow-outs due to high internal temperatures developed while the band is operating under heavy working conditions.

Modifications of the structure herein disclosed may be resorted to without departing from the spirit of the invention or the scope thereof as defined by the appended claims.

What is claimed is:—

1. A traction member in the form of an endless band of rubber comprising a body portion, a reenforcing member embedded therein and vulcanized therewith, said member including a fibrous reenforcing cord spirally wound about the band in a plurality of transversely extending layers, a jacket of semi-hard rubber embedding the separate convolutions of said cord, and a plurality of coverings of rubber of graduated stiffness surrounding the jacket and covered by the body.

2. A traction member for the uses and purposes set forth, comprising an endless band of rubber and a reenforcing member embedded therein and vulcanized thereto, said member extending transversely of the band at an approximately central plane thereof and including a flexible fibrous cord wrapped in a plurality of convolutions from one side of the reenforcement to the other and in a plurality of radially superposed layers, a jacket of semi-hard rubber encased about the cord reenforcement and separately embedding each convolution thereof, and a plurality of coverings of graduated stiffness surrounding said jacket.

3. A traction member in the form of an endless band of rubber comprising a body portion and a reenforcing member embedded therein and vulcanized thereto, said member extending transversely of the band at an approximately central plane thereof and including a flexible fibrous cord wrapped in a plurality of convolutions from one side of the reenforcement to the other and in a plurality of radially superposed layers, a jacket of semi-hard rubber encased about the cord reenforcement and separately embedding each convolution thereof, and a layer of rubber of intermediate stiffness interposed between said jacket and the body of the rubber band.

4. In a tractor tire, an endless band of rubber, comprising a body portion, a central core of circumferentially extending fibrous reinforcing cords, a jacket of semi-stiff rubber compound in which said cords are embedded, and a layer of rubber interposed between the jacket and the body of said band, said layer being of a stiffness intermediate that of the jacket and that of the body of the band.

5. A tractor tire comprising an endless band of rubber, a central core of circumferentially extending fibrous reenforcing cords, a jacket of semi-stiff rubber compound in which said cords are embedded, and a plurality of layers of rubber surrounding said core and composed of rubber of graduated stiffness, the stiffness of the successive layers decreasing outwardly of the core.

6. A tractor tire in the form of an endless band of rubber, and comprising a body portion and a central semi-stiff core, and a plurality of layers of rubber surrounding said core and being surrounded by the body portion of the band, said layers composed of rubber of graduated stiffness, the stiffness of the successive layers decreasing outwardly of the core.

ERNEST P. ENGSTROM.